United States Patent
Matthews

(12) 
(10) Patent No.: US 6,424,412 B1
(45) Date of Patent: Jul. 23, 2002

(54) EFFICIENT SYSTEM AND METHOD FOR DETECTING AND CORRECTING LASER MISALIGNMENT OF PLURAL LASER BEAMS

(75) Inventor: Edward W. Matthews, San Diego, CA (US)

(73) Assignees: Sony Corporation (JP); Sony Electronics, Inc.

( * ) Notice: Subject to any disclaimer, the term of this patent is extended or adjusted under 35 U.S.C. 154(b) by 0 days.

(21) Appl. No.: 09/651,165

(22) Filed: Aug. 30, 2000

(51) Int. Cl.$^7$ ............................. G01B 11/26; H04N 3/22
(52) U.S. Cl. ...................... 356/152.1; 348/745; 356/153
(58) Field of Search ............................. 356/152.1, 153; 348/745

(56) References Cited

U.S. PATENT DOCUMENTS

| | | | |
|---|---|---|---|
| 4,655,590 A | * | 4/1987 | Aagano et al. |
| 5,475,447 A | * | 12/1995 | Funado ...................... 348/745 |
| 6,222,593 B1 | * | 4/2001 | Higurashi et al. .......... 348/745 |

* cited by examiner

*Primary Examiner*—Stephen C. Buczinski
(74) *Attorney, Agent, or Firm*—Townsend and Townsend and Crew LLP

(57) ABSTRACT

A system for detecting deviations from an optical axis of one or more individual component beams associated with plural laser beams. The system includes a first mechanism that selectively isolates individual component beams from plural laser beams and provides the individual component beams as output in response thereto. A second mechanism detects deviations from a desired optical axis of the individual component beams output from the first mechanism. In the specific embodiment, the system further includes a mechanism that automatically corrects the detected deviations of each component beam of the plural beams. A beam pick-off device, such as a pick-off collimating lens or beam splitter, redirects a sample of the plural beams, which represents separated plural beams to a color wheel. The individual component beams include red, green, and blue laser beams. The color wheel selectively isolates the red, green, and/or blue beams from the separated plural beams and provides an isolated component beam as output in response thereto. A beam splitter splits the isolated component beam into a first split beam and a second split beam and directs the first split beam and the second split beam along a first optical path that terminates at a first detector and a second optical path that terminates at a second detector, respectively. The lengths of the first and second optical paths differ by a predetermined distance. Software running on a computer compares the relative position of the first split beam on the first detector to the position of the second split beam on the second detector with reference to the predetermined distance and provides a beam deviation signal in response thereto. The software then actuates a beam deviation correction system to correct for beam deviations indicated by the beam deviation signal associated with the isolated beam in the plural beams.

20 Claims, 7 Drawing Sheets

EFFICIENT SYSTEM AND METHOD FOR DETECTING AND CORRECTING LASER MISALIGNMENT OF PLURAL LASER BEAMS

BACKGROUND OF THE INVENTION

1. Field of Invention

This invention relates to lasers. Specifically, the present invention relates to systems and methods for detecting and correcting beam misalignment in systems employing multiple laser beams, such as projection display and other laser systems.

2. Description of the Related Art

Multiple laser beams are employed in various demanding applications including front and rear projection devices in movie theaters, home theater systems, heads-up displays for automobiles and aircraft cockpits, and design workstations. Such applications often require precise coaxial alignment of multiple laser beams for maximum display quality. Typically, each beam of the multiple beams is at a different frequency.

Undesirable laser beam deviation is particularly problematic in projection display applications, where beam misalignment may significantly degrade image quality. In laser projection systems, optical components may shift over time, creating corresponding undesirable laser beam path deviations, which degrade display quality. Consumers demand reliable high-quality displays.

An exemplary projection display system includes multiple coaxial laser beams, including red, blue, and green laser beams. A controller employs image information to generate control signals, which are provided to one or more light modulators and a scanner. The light modulators selectively modulate the intensity of each beam to adjust the overall color of the multiple coaxial beams in accordance with control signals received from the controller. A scanner (projection optics) then projects the modulated beams onto a screen, forming a dot (pixel) at a predetermined screen location. By scanning the entire screen and selectively controlling the color of each pixel via the light modulators and associated control signals, desired image information is displayed.

Misalignment of the coaxial beams relative to the desired optical axis degrades beam convergence on the screen, which degrades image quality. Furthermore, beam misalignment may prevent proper illumination of light modulator input surfaces, resulting in reduced display brightness, image artifacts, and preventing accurate non-uniformity correction, which results in undesirable pixel-to-pixel variations in screen intensity.

Laser applications employing multiple beams are relatively new, and beam orientation systems for automatically aligning plural laser beams have been slow to develop. Systems and methods for aligning an individual laser beam to a predetermined optical axis are known in the art. Unfortunately, existing systems generally cannot accurately and automatically detect beam misaligmnent and realign multiple laser beams or sets of closely spaced parallel beams.

Hence, a need exists in the art for an efficient system and method for automatically detecting and correcting laser beam misalignment. There exists a further need for a system that can efficiently and automatically detect and correct misalignment of plural beams directed along predetermined optical axis.

SUMMARY OF THE INVENTION

The need in the art is addressed by the system for detecting misalignment of plural beams of the present invention. In the illustrative embodiment, the inventive system is adapted for use with a laser projector. The system includes a first mechanism for automatically selectively isolating the individual component beams from the plural beams and providing each of the individual component beams as output in response thereto. A second mechanism detects misalignment relative to a desired optical axis of an individual component beam output from the first mechanism.

In a more specific embodiment, the system further includes a mechanism for automatically correcting the detected misalignment. The first mechanism includes a mechanism for sampling the plural beams and providing separated plural beams in response thereto. The mechanism for sampling includes a collimating lens or a pick-off beam splitter. The individual component beams include a red beam, a green beam, and a blue beam. A color wheel selectively isolates the red, green, and/or blue beams from the separated plural beams and provides an isolated component beam as output in response thereto. A beam splitter splits the isolated component beam into a first split beam and a second split beam and directs the first split beam and the second split beam along a first optical path and a second optical path, respectively. The first optical path terminates at a first detector, and the second optical path terminates at a second detector. The lengths of the first and second optical paths differ by a predetermined distance. A first control algorithm compares the relative position of the first split beam on the first detector to the position of the second split beam on the second detector with reference to the predetermined distance and provides a beam deviation signal in response thereto. A second control algorithm actuates a beam deviation correction system to correct the plural beams for beam deviations indicated by the beam deviation signal associated with the isolated beam.

In a first alternative embodiment, the first optical path passes through a first electrically controllable shutter, reflects from a first reflector, passes back through the beam splitter and then onto the surface of a single detector. The second optical path passes through a second electrically controllable shutter, reflects from a second reflector, passes back through the beam splitter and then onto the surface of the single detector. The second mechanism includes a computer for providing control signals to selectively shutter the first and second split beams via the first and second electrically controllable shutters to create first and second spots, respectively, on a surface of the single detector. The computer analyzes the positions of the first and second spots to measure beam deviation or misalignment associated with the isolated beam.

In a second alternative embodiment, the mechanism for redirecting a sample includes a first pick-off beam splitter in series with a second pick-off beam splitter for redirecting a first sample(s) of the plural beams along a first path and a second sample(s) of the plural beams along a second path, respectively. The first path passes through a first color wheel and terminates on the surface of a first detector. The second path passes through a second color wheel and terminates on the surface of a second detector. The first and second paths have predetermined differing lengths. A controller controls the first and second color wheels and calculates beam misalignment associated with isolated beams output from the first and second color wheels.

The novel design of the present invention is facilitated by the first mechanism, which allows individual component beams of plural laser beams to be automatically and selectively isolated and analyzed for beam position and orientation deviations from a desired optical axis. After component beam deviations are detected, they may then be corrected, resulting in precisely aligned plural beams. Consequently, by employing the plural beam deviation detection and correction systems of the present invention, accompanying laser projection systems and other applications requiring plural precisely aligned laser beams may operate more effectively and reliably.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
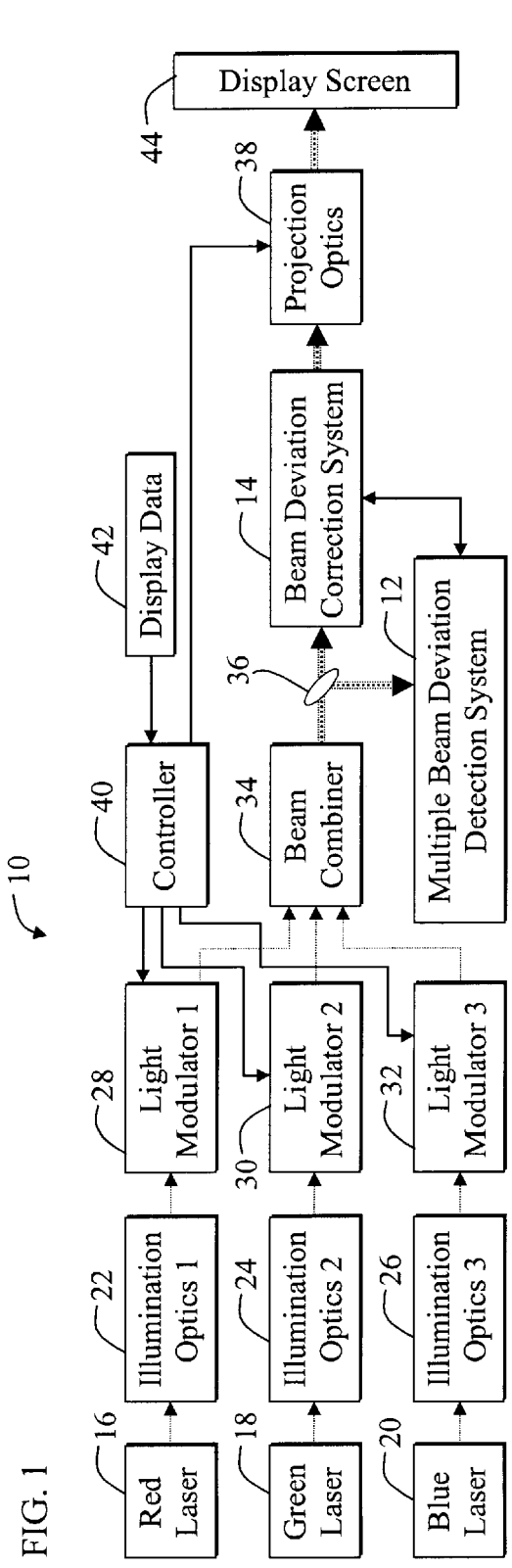
FIG. 1 is a diagram of a laser projection system having a unique multiple beam deviation detection system and deviation correction system constructed in accordance with the teachings of the present invention.

FIG. 1 is a diagram of a laser projection system 10 having a unique multiple beam deviation detection system 12 and deviation correction system 14 constructed in accordance with the teachings of the present invention. For clarity, various components, such as power sources and image input devices, are not shown in FIG. 1, however one skilled in the art with access to the present teachings will know where and how to implement the additional requisite components.

The laser projection system 10 includes a red laser 16, a green laser 18, and a blue laser 20, which provide output laser beams to a first set of illumination optics 22, a second set of illumination optics 24, and a third set of illumination optics 26, respectively. The first set of illumination optics 22, the second set of illumination optics 24, and the third set of illumination optics 26, provide output to a red light modulator 28, a green light modulator 30, and a blue light modulator 32, respectively. The light modulators 28, 30, and 32 provide output to a beam combiner 34. The beam combiner 34 outputs multiple beams directed along approximately similar optical axis to a pick-off lens 36, which provides multiple beams, which are approximately coaxial, to the beam deviation detection system 12 and to the beam deviation correction system 14. The beam deviation detection system 12 communicates with the beam deviation correction system 14. Multiple approximately coaxial beams that have been corrected for component beam misalignment or deviation from a desired optical axis are input to projection optics 38. A controller 40 receives display data 42 as input and provides control inputs to the light modulators 28, 30, and 32, and to the projection optics 38. The projection optics 38 output multiple beams, which are approximately coaxial, to a display screen 44.

While the multiple beams may have several parallel component beams, the laser projection applications discussed herein will typically employ multiple beams whose component beams are intended to travel along) approximately similar optical axis, corresponding to a desired axis of the multiple beams. Typically, for the laser projection applications discussed herein, the multiple beams will not significantly deviate from the desired optical axis so as to cause one or more of the component beams to miss the input surfaces of various optical devices employed by the present invention, such as the pick-off lens 36.

In operation, the illumination optics 22, 24, and 26 shape the red, green, and blue laser light output from the red laser 16, green laser 18, and blue laser 20, respectively, in preparation for input to the light modulators 28, 30, and 32, respectively. The red, green, and blue beams are shaped by the illumination optics 22, 24, and 26, respectively, usually in accordance with the dimensions of the input surfaces of the light modulators 28, 30, and 32 to maximize laser energy received by the light modulators 28, 30, and 32.

The controller 40 employs the display data 42 to generate control signals for controlling the light modulators 28, 30, and 32. The control signals command the light modulators 28, 30, and 32 to selectively adjust or modulate the intensity profile of the red, green, and blue laser beams in accordance with the image data 42 to be displayed. The modulated laser beams are then combined by the beam combiner 34 into multiple beams having approximately similar optical axis.

The display data 42 is typically divided into pixels of different colors. By individually controlling the intensity profiles of each red, green, and blue laser beam via the light modulators 28, 30, and 32, respectively, the color of a given pixel is established and corresponds to the color of the combined multiple beams output by the beam combiner 34.

A small fraction of the modulated multiple beams output by the beam combiner 34 is picked-off, redirected, or sampled via the pick-off lens 36 and sent to the beam deviation detection system 12. The remaining portion(s) of the multiple beams is input to the beam deviation correction system 14.

Those skilled in the art will appreciate that a mechanism other than the pick-off lens 36, such as a beam splitter, may be employed to pick off a portion of the output of the beam combiner 34, without departing from the scope of the present invention. Furthermore, the fraction of the energy of the multiple beams picked off by the pick-off lens 36 is application-specific and may be determined by one skilled in the art to meet the needs of a given application.

The beam deviation detection system 12 analyzes the picked-off multiple beams to determine if the red laser component, the green laser component, and/or the blue laser component are properly aligned with one or more predetermined desirable optical axis associated with the multiple beams. Amounts by which any of the red, green, or blue component beams deviate from the one or more desired optical axis are determined by the beam deviation detection system 12, which provides control signals to the beam deviation correction system 14 in response thereto. The beam deviation correction system 14 adjusts the optical axis of each component beam to cancel undesirable component beam deviations from the one or more desired optical axis of the multiple beams, as specified by the beam deviation detection system 12.

A closed-loop feedback path exists between beam deviation detection system 12 and the beam deviation correction system 14 to facilitate the elimination of beam deviations. Those skilled in the art will appreciate that the beam alignment control system implemented by the beam deviation detection system 12 and the beam deviation correction system 14 may be implemented via open-loop control methodology rather than closed-loop control methodology without departing from the scope of the present invention.

After the multiple beams are properly aligned with the one more desired optical axis, the aligned multiple beams are output to projection optics 38. The projection optics 38 direct the multiple beams onto a display screen 44. The projection optics 38 rapidly scan the display screen 44 as the light modulators 28, 30, and 32 adjust the color of the combined multiple beams, which results in a desired image being displayed in the display screen 44. Hence, by selectively orienting the modulated multiple beams relative to the display screen 44 via the projection optics 38, and modulating the multiple beams, via the light modulators 28, 30, and 32, in accordance with image information received by the controller, a desired image is displayed on the screen 44.

The construction of the lasers 16, 18, 20, the illumination optics 22, 24, and 26, the light modulators 28, 30, and 32, the beam combiner 34, the pick-off lens 36, the controller 40, the projection optics 38, and the display screen 44 are known in the art. For example, the projection optics 38 may be implemented via scanner with two degrees of freedom as provided by first and second mirrors (not shown) having first and second axis of rotation respectively, the orientations of which are controlled by motors (not shown) that receive control signals from the controller 40. An exemplary scanner is disclosed in U.S. Pat. No. 4,213,146, entitled, SCANNING SYSTEM FOR LIGHT BEAM DISPLAYS, herein incorporated by reference.

A preferred embodiment of the present invention uses grating light valves (GLVs) produced by Silicon Light Machines. Such modulators require a beam of about 1 inch by 25 microns. These modulators are described in detail in documents available at www.siliconlight.com and in patents such as U.S. Pat. No. 5,841,579; herein incorporated by reference. The beam deviation detection system 12 and the beam deviation correction system 14 are discussed more fully below.

Figure 2:
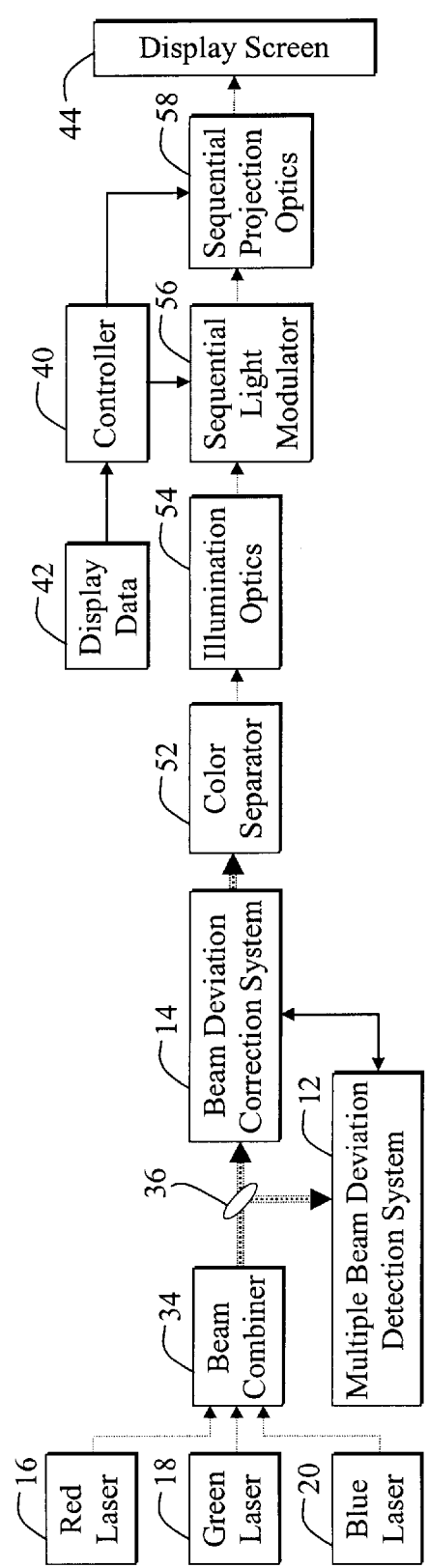
FIG. 2 is diagram of a sequential laser projection system constructed in accordance with the teachings of the present invention.

FIG. 2 is diagram of a sequential color modulator projector 50 constructed in accordance with the teachings of the present invention. In the projector 50, the red laser 16, the green laser 18, and the blue laser 20 provide corresponding red, green, and blue output beams directly to the beam combiner 34. The output of the beam combiner 34 is multiple beams comprising red, greed, and blue beams that are input to the pick-off lens 36. Output of the pick-off lens 36 is provided to the beam deviation detection system 12 and to the beam deviation correction system 14. Output of the beam deviation correction system 14 is input to a color separator 52, which sequentially outputs red, green, and blue beams to illumination optics 54. The illumination optics 54 sequentially outputs shaped red, green, and blue beams to a sequential light modulator 56. Output of the sequential light modulator 56 is input to sequential projection optics 58. The controller 40 receives display data 42 and provides corresponding control signals to the sequential light modulator 56 and the sequential projection optics 58.

In operation, the beam deviation detection system 12 and the beam deviation correction system 14 detect and correct, respectively, any component beam misalignments from a desired optical axis of the multiple beams output from the beam combiner 34. The corrected multiple beams arc provided to the color separator 52, which sequentially separates the red, green, and blue beams via a color wheel or related mechanism. The illumination optics 54 shape the output red, green, and blue beams in sequence, and provide the shaped beams to the sequential light modulator 56. The sequential light modulator 56 sequentially modulates the received red, green, and blue beams, in accordance with display data 42 received by the controller 40 as indicated via control signals received from the controller 40. The sequential projection optics 58 then sequentially project the individual red, green, and blue beams onto the display screen 44 to display a desired image.

Those skilled in the art will appreciate that the lasers 18, 18, and 20 may be replaced with other mechanisms for generating beams such as light emitting diodes and collimators, without departing from the scope of the present invention.

Figure 3:
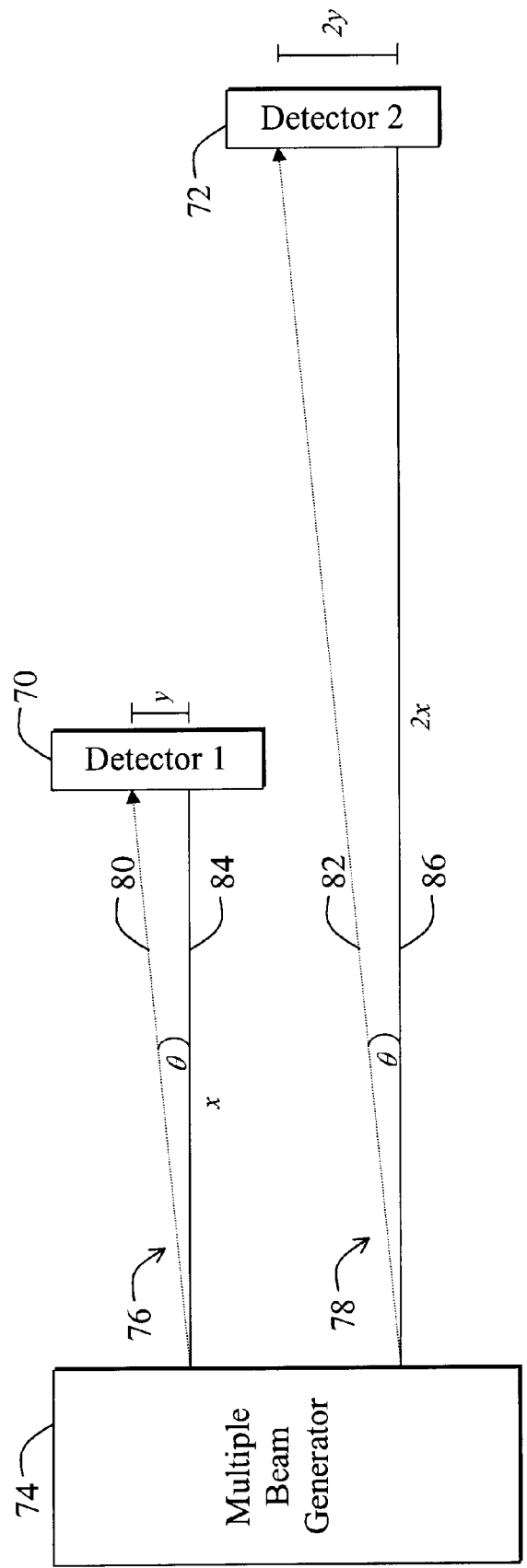
FIG. 3 is a diagram illustrating a beam deviation principle employed by the multiple beam deviation detection system of FIGS. 1 and 2.

FIG. 3 is a diagram illustrating a beam deviation principle employed by the multiple beam deviation detection system 12 of FIGS. 1 and 2. FIG. 3 illustrates differences in component beam separation on the surface of a first detector 70 and a second detector 72 at different distances from a multiple beam source 74 projecting first and second identical sets of multiple beams 76 and 78, respectively, having deflected component beams 80 and 82, respectively. The component beams 80 and 82 are deflected by the angle from the corresponding desired beam axis 84 and 86, respectively.

The second detector 72 is positioned a distance of 2x from the multiple beam generator 74, while the first detector 70 is positioned a distance of x from the multiple beam generator 74, which is half the distance between the multiple beam generator 74 and the second detector 72. Consequently, at the surface of the first detector 70, the center of the first deflected beam 80 deviates by a distance of y from the corresponding desired optical axis 84. The deviation of the second deflected beam 82 on the surface of the second detector 72 is 2y, which is twice the deviation of the first deflected beam 80 on the surface of the first detector 70. The deflection angle is the same for the first deflected beam 80 and the second deflected beam 82. Consequently, the ratio of the deviation distances (y and 2y) of the deflected beams 80 and 82 on the surfaces of the detectors 70 and 72 is proportional to their distances (x and 2x) from the multiple beam generator 74. Hence, y/x=2y/2x=tan.

If information from the first detector 70 and the second detector 72 were superimposed, the surface of the superimposed detector would have two deviating dots positioned away from a desired optical axis. One dot would correspond to the deflection associated with the first deflected beam 80 and the other dot would correspond to the deflection associated with the second deflected beam 82. The first dot would be positioned halfway between the second deflected dot and the desired optical axis. With the predetermined knowledge that the first deflected beam 80 travels half as far as the second deflected beam 82, the angle by which the beam is deflected in two-dimensional space relative to a plane perpendicular to the desired optical axis is easily calculated.

If only a one-dimensional beam deviation is present, such as only angular deviation, only one detector is required to calculate the deviation angle (=arc tan (y/x)). However, a beam may deviate in two dimensions relative to a plane perpendicular to the desired optical axis. For example, the beam may be offset parallel to the desired optical axis. Consequently, a second detector is required to provide an additional degree of freedom to accurately specify the beam deviation. Although the preferred embodiment uses two detectors, any number of detectors can be used.

The beam deviation detection system 12 of FIGS. 1 and 2 sequentially separates component red, green, and blue beams from the multiple laser beams, and splits each component beam into two paths of differing lengths. The different length beam paths yield different beam deflection positions, which are employed to calculate the deviation of a given component beam from one or more desired axis associated with the multiple beams, as discussed more fully below.

Figure 4:
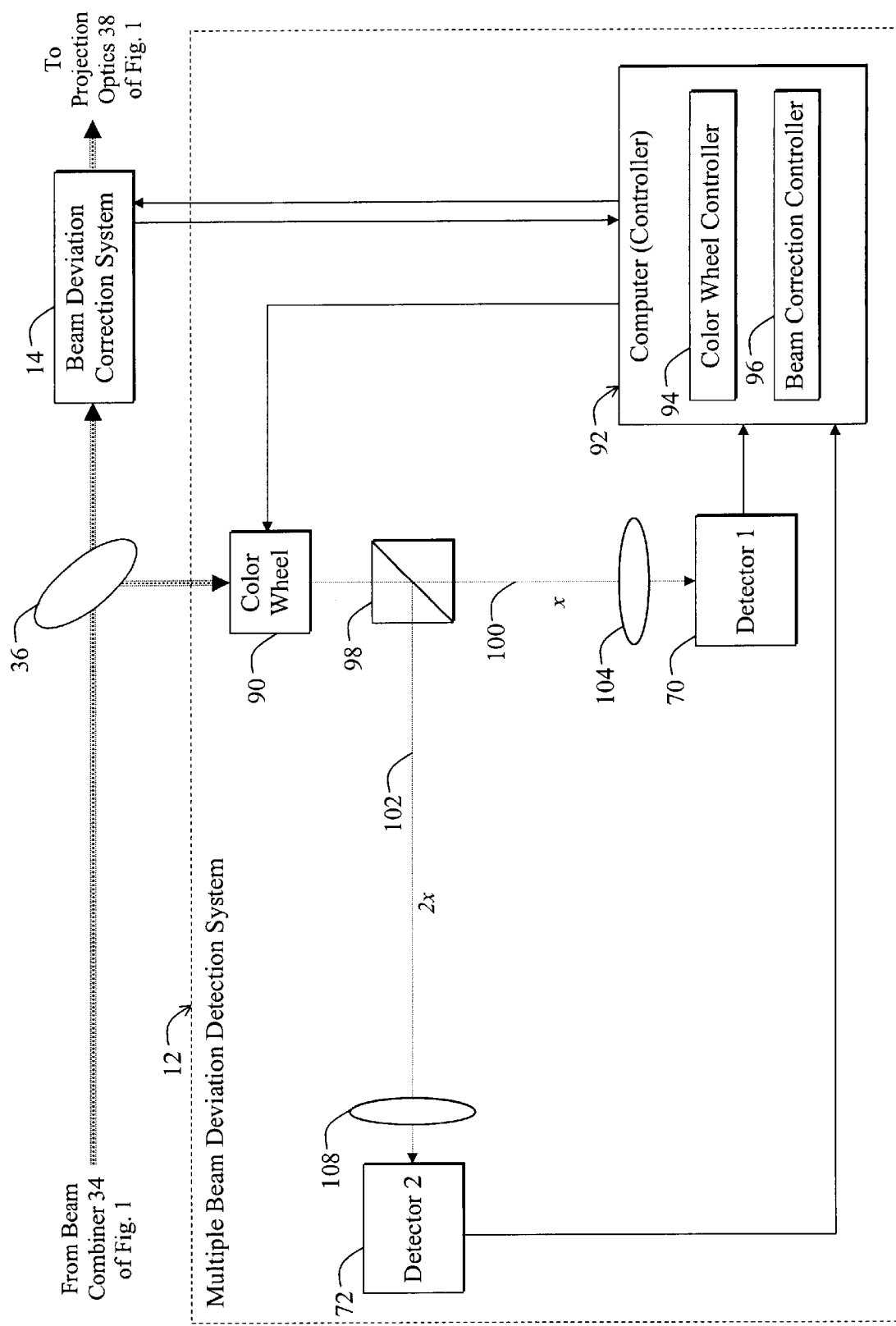
FIG. 4 is a more detailed diagram illustrating the multiple beam deviation detection system of FIGS. 1 and 2.

FIG. 4 is a more detailed diagram illustrating a preferred embodiment of the multiple beam deviation detection system 12 of FIG. 1. For clarity, various components may not be shown in FIG. 1, however one skilled in the art with access to the present teachings will know where and how to implement the additional requisite components.

Pick-off lens 36 splits off a small portion of the multiple beams, which is input to a color wheel 90 of the multiple beam deviation detection system 12. The remaining beam is output from the pick-off lens and input to the beam deviation correction system 14. Note that although beam correction is discussed herein as occurring after beam pick off that such correction may be more advantageously applied before beam pick off. Additionally, one contemplated embodiment of the invention performs beam misalignment detection and correction at the factory at the time of manufacturing a multiple beam device. In this latter case, no misalignment detection or correction circuitry is included with the commercial device.

The color wheel 90 receives control input from a computer 92 having a color wheel controller 94 and a beam correction controller 96. The controllers 94 and 96 may be implemented in software. The color wheel 90 alternately isolates the red beam, green beam, and blue beam from the received multiple beams in response to control signals from the color wheel controller 94 running on the computer 92. The color wheel 90 outputs one beam at a time to the beam splitter 98, which splits the single beam into a first beam path 100 and a second beam path 102. The first beam path 100 passes through a focusing lens 104, which focuses the beam onto the first optical detector 70. The second beam path 102 passes through a second focusing lens 108, which focuses the beam associated with the second beam path onto the second optical detector 72. Input surfaces of the various optical devices of the multiple beam deviation detection system 12, such as the input surfaces of the color wheel 90, the beam splitter 98, and the detectors 70 and 72 are oriented perpendicular to a desired optical axis of the input beams.

In the present embodiment, the detectors 70 and 72 are implemented via detector arrays, such as Charge-Coupled Device (CCD) arrays or other focal plane arrays. The detectors 70 and 72 output signals indicating the position of the beams associated with the paths 100 and 102, on the surfaces of the detectors 70 and 72, respectively. The centroid of each detected beam is calculated for the surface of each detector 70 and 72 and provided to the beam correction controller 96 running on the computer 92. The beam correction controller 96 computes the deviation of the component beam output from the color wheel 90 based on the positions of the centroids of the beams on the surfaces of the detectors 70 and 72. The beam correction controller 96 then generates appropriate control signals, which are provided to the beam deviation correction system 14 to realign the component beam.

Note that the use of CCD arrays for the detectors can allow the system to detect whether a non-rotationally symmetric beam (e.g., a line beam or square beam) is out of rotational alignment.

The beam correction controller 96 communicates with the detectors 70 and 72. In the present specific embodiment, the beam correction controller 96 is implemented in software running on the computer 92. The beam correction controller 96 and the beam deviation correction system 14 implement a closed loop control system with feedback from the beam deviation correction system 14 to the beam correction controller 96. After beam alignment corrections are made to a given component beam by the beam deviation correction system 14, the beam deviation system 14 requests an update of the beam deviation as determined via the beam correction controller 96. The beam deviation correction system 14 continues to make adjustments until the deviation reaches zero. After the component beam is aligned, the computer 92 commands the color wheel 90 to isolate a different beam for correction.

The beam deviation correction system 14 and the beam correction controller 96 may implement an open-loop control algorithm without departing from the scope of the present invention. For example, feedback from the beam deviation correction system 14 and the beam correction controller 96 may be omitted.

The beam deviation correction system 14 operates on the principle that a beam may be aligned to a given axis by mirrors or other mechanisms for providing sufficient degrees of freedom. Conventional beam alignment systems may be adapted for use with the present invention by one skilled in the art without departing from the scope thereof. The beam deviation correction system 14 includes a color wheel 90 or other beam selection system for selecting the beam requiring correction from the received multiple beams. Two mirrors having horizontal and vertical axis in communication motors driven by control signals from the beam correction controller 96 may then align the component beam to a desired predetermined axis in response to the control signals.

A book by Gene F. Franklin, J. David Powell, and Abbas Emami-Naeii entitled FEEDBACK CONTROL OF DYNAMIC SYSTEMS, Second Edition, published by Addison Wesley 1991, describes general control theory that one skilled in the art may easily apply to construct the application-specific details of the controllers 94 and 96 employed to cancel measured beam deviations via a system of position-controllable beam alignment mirrors employed by the beam deviation correction system 14.

In the present specific embodiment, the first path 100 is half the length of the second path 102. Those skilled in the art will appreciate that the lengths of the paths 102 and 100 are application-specific and may differ from the 2 to 1 relationship employed in the present embodiment, without departing from the scope of the present invention.

While the multiple beam deviation detection system 12 sequentially corrects the orientations and positions of the component red, blue and green beams output from the color wheel 90, the present invention may easily be adapted to correct for beam alignment in parallel. In this case, the color wheel may be replaced by another device for isolating red, green, and blue beams from the multiple beams in parallel rather than sequentially.

Systems for isolating component beams from multiple beams may be developed by one skilled in the art with access to the present teachings. A simple apparatus employing one or more additional beam splitters (not shown) and selective positioning of red, green, and blue optical filters may be employed to isolate red, green, and blue beams in parallel, or sequentially as performed by the color wheel 90.

Alternatively, the color wheel 90 may be replaced with a device that isolates component beams in accordance with component beam polarization. For example, oppositely polarized beams may be extracted from the multiple beams via selectively placed oppositely polarized filters. For example one polarization filter may pass a first component beam while blocking a second beam, while another polarization filter that passes the second beam and blocks the first beam. By alternately employing the first and second polarization filters, the first and second beams may be isolated from the associated multiple beams.

Those skilled in the art will also appreciate that the multiple beams may have a plurality of parallel laser beams aligned to corresponding plural desired parallel axis rather than coaxial beams, without departing from the scope of the present invention. The parallel beams may be aligned to one or several predetermined desired optical axis rather than a single axis. Furthermore, those skilled in the art will appreciate that the beam deviation detection system 12 may employ the color separator 52 of FIG. 2 or other color wheel (not shown) employed by the sequential light modulator 56 of FIG. 2 in place of the color wheel 90 without departing from the scope of the present invention.

The multiple beam deviation detection system 12 includes a mechanism for isolating 90 the beam to be corrected from the main beam and a mechanism for re-aligning 14 a corresponding component beam with a desired axis. A control algorithm implemented via the beam correction controller 96 and/or another controller (not shown) implemented in the beam deviation correction system 14 cancels detected beam deviation.

Hence, the multiple beam deviation detection system 12 and the beam deviation correction system 14 automatically align multiple laser beams of different colors along the same optical axis.

The multiple beam deviation detection system 12 uses a color wheel 90 or similar device, the first photo detector 70, the second photo detector 72, and the 50% beam splitter 98. The color wheel 90 sequentially selects each color beam from the multiple beams. The detectors 70 and 72 then check the position of each beam relative to each other on the surface of the detectors 70 and 72. By using two detectors 70 and 72 at different distances, any significant lateral shift or angular change in beam position can be detected in any beam.

The inclusion of a color wheel 90 in the beam position and pointing detection system 12 allows several beams along the same axis but of different colors to be sequentially monitored for position, pointing and angular stability. The color wheel 90 could be combined with other measurement techniques without departing from the scope of the present invention.

Depending upon the particular design of the projection system 10 of FIG. 1, the collimating lens 36 may or may not be required to collimate the split beam. The collimated light illuminates part of the color wheel 90, which allows just one color to pass at a time in the present embodiment. The color wheel 90 is controlled by the color wheel controller 94 running on the computer 92 or by a synchronization signal (not shown) from another component in the projector 10 of FIG. 1.

The component beam output from the color wheel 90 encounters the 50% non-polarizing beam splitter 98, which allows half of the light to pass through and deviates the other half in a perpendicular direction. The resulting beams then encounter the focusing lenses 104 and 108, which focus the light onto the separate photo detectors 70 and 72, respectively. The distances between the beam splitter 98 and the two detectors 70 and 72 differ by enough to detect component beam angular changes to sufficiently correct component beam misalignment.

Each photo detector 70 and 72 is a two-dimensional array, where the light intensity profile creates a corresponding voltage or current signal giving two dimensions for the points. The light reaching the first detector 70 follows a shorter beam path 100 than the light 72 reaching the second detector 72. Consequently, any significant change in the angle of the component beam relative to the desired beam axis is detected as a greater change in the beam position on the second detector 72. If the beam is shifted to a path parallel to the optical axis, then the change in position detected at both detectors 70 and 72 will be approximately equal.

The computer 92 analyzes the resulting information. The beam profile at each detector 70 and 72 is used to calculate a central point (centroid) in each detector plane. Then the equation of the line between these two points may then be calculated to facilitate beam deviation determination. This process is performed independently for each color beam. By comparing the positions of the centroids associated each color on the detectors 70 and 72, the convergence of the beams onto a display screen can be measured. By comparing the line equation and the positions of the centroids to one or more references, the absolute position of the component beam on the screen can be calculated. If a component beam changes position, then the computer 92 can remotely control a system of mirrors implemented in the beam deviation correction system 14 to correct the position and/or orientation of the beam.

Figure 5:
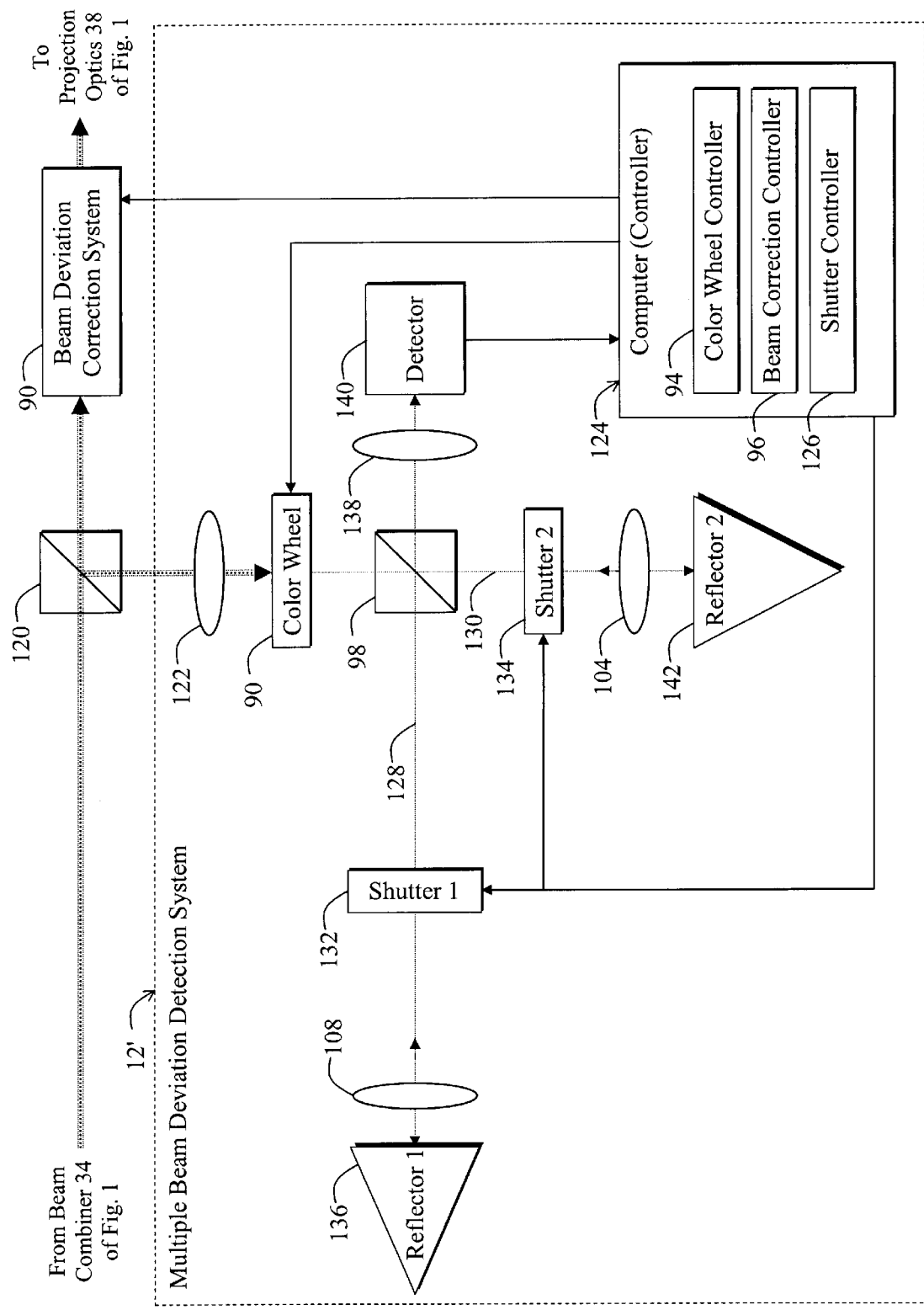
FIG. 5 is a diagram illustrating a first alternative embodiment of the multiple beam deviation detection system of FIG. 4.

FIG. 5 is a diagram illustrating a first alternative embodiment 12' of the multiple beam deviation detection system 12 of FIG. 4. An input beam splitter 120 splits a fraction of the main input multiple beams, such as a fraction representing 1% of the energy of the multiple beams, and provides the fraction to an input collimating lens 122. The remaining 99% of the multiple beams is input to the beam deviation correction system 14. A collimated multiple beam output from the first collimating lens 122 is input to the color wheel 90, which sequentially selects and outputs red, green, and blue constituent beams to the 50% beam splitter 98 in response to control signals received from a computer 124. The computer 124 is similar to the computer 92 of FIG. 4 with the exception that the computer 124 includes an additional shutter controller 126. The shutter controller 126 selectively shutters a first split beam 128 and a second split beam 130 output from the 50% beam splitter 98 via a electrically controllable first shutter 132 and a second electrically controllable shutter 134, respectively.

When the multiple beam deviation detection system 12' is in a first mode, the first shutter 132 is open and the second shutter 134 is closed. When the first shutter 132 is open, the first split beam 128 travels along a first optical path from the 50% beam splitter 98, through the first focusing lens 108 and onto the surface of a first reflector 136. The first split beam 128 is reflected by the first reflector 136, travels back through the focusing lens 108, and back through the beam splitter 98, through a third focusing lens 138 and onto a single detector 140. The detector 140 registers the portion of the split beam 128 impinging on the surface of the detector 140. The computer 124 then computes the position of the centroid of the impinging beam on the surface of the detector 140 via software implemented in the beam correction controller 96. The position of the centroid is then stored in memory (not shown) associated with the computer 124.

When the multiple beam deviation detection system 12' is in a second mode, the second shutter 134 is open, while the first shutter is closed 132. The second split beam 130 passes through the second shutter 134, through the second focusing lens 104, onto the surface of a second reflector 142, and then back along the same path to the 50% beam splitter 98. The 50% beam splitter 98 directs a 50% of the second split beam 130 back to the third focusing lens 138 and onto the surface of single detector 140. The detector 140 registers the impinging beam and provides a signal in response thereto to the computer 124. The computer then calculates the position of centroid of the impinging beam on the surface of the detector 140 via standard centroid calculation methods.

The length of the optical path traveled by the first split beam 128 differs from the length of the optical path traveled by the second split beam 130 by a predetermined distance. The position of centroid of the beam, which corresponds to the second split beam 130, is compared to the position of the centroid associated with the first split beam 128, which was previously stored in a memory (not shown) of the computer 124. The comparison is performed by the beam correction controller 96. The beam correction controller 96 computes the deviation of the component beam output from the color wheel 90 from a desired optical axis. The deviation is a function of the positions of centroids on the surface of the detector 140 and differences in path lengths associated with the first split beam 128 and the second split beam 130. The calculated beam deviation is then cancelled by the beam deviation correction system 14 in response to control signals received from the beam correction controller 96. The color wheel controller 94 controls the output of the color wheel 90 and determines which component beam of the input multiple beams will be selected for alignment.

For the purposes of the present discussion, the term color wheel refers to any mechanism that can selectively output individual component beams of multiple beams including multiple colored beams based on component beam color and in response to control signals received from a controller, such as the color wheel controller 94. One skilled in the art with access to the present invention may easily build such a device, modify an existing device, or order a device to perform these functions.

Those skilled in the art will appreciate that the first focusing lens 108 and the second focusing lens 104 may be omitted without departing from the scope of the present invention. Furthermore, the 50% beam splitter 98 may be replaced with a different beam splitter, such as a 40–60% beam splitter, without departing from the scope of the present invention.

The color wheel 90 may be used with other position detection arrangements as discussed more fully below. Furthermore, the number of photo detectors can vary. If only one photo detector is used, then some means of changing the path length of the detector may be required. In the configuration shown in FIG. 5, a pair of shutters 132 and 134 is employed to alternately block one of two paths, associated with the beams 128 and 130, of unequal lengths.

For a more sensitive measurement, an interferometer (not shown), such as a Mach-Zender, can be used after the color wheel 90. An interferometer creates an interference pattern whose fringes can be detected. Any change in the relative phase of the laser beam causes the fringe pattern to shift accordingly, which facilitates calculation of beam position and/or pointing and corresponding determination of beam deviation from a desired optical axis.

Those skilled in the art will appreciate that after one or more component beams are isolated via the color wheel 90 or similar mechanism, various conventional beam deviation detection and alignment systems (not shown) for correcting misalignment of a single beam may be appropriately modified and employed in place of the systems described herein without departing from the scope of the present invention.

Hence, the alternate configuration of the beam deviation detection system 12' employs two remotely-controlled shutters 132 and 140, two extra reflecting surfaces (mirrors) 136 and 142, and only one detector 140. Multiple picked-off laser beams through the first collimating lens 122, which may not be required for some applications. The resulting collimated light passes through the color wheel 90 and the second non-polarizing beam splitter 98. In this configuration, the two beams 128 and 130 leaving the second beam splitter 98 encounter the first or second shutters 132 and 140, respectively, only one of which is open at a given time.

When open, the shutter 132 or 134 allows the light to pass to the corresponding reflector 136 or 142, respectively, reflect back through the open shutter 132 or 134, pass back through the second beam splitter 98, and then to the third focusing lens 138, which focuses the light onto the single detector 140. The distances between the second beam splitter 98 and the two reflecting surfaces 136 and 142 differ by enough to detect angular changes in the beam.

By alternating which shutter 132 or 134 is open, two points along the beam path can be measured in sequence, rather than in parallel, as in the previously described configuration of FIG. 4.

Figure 6:
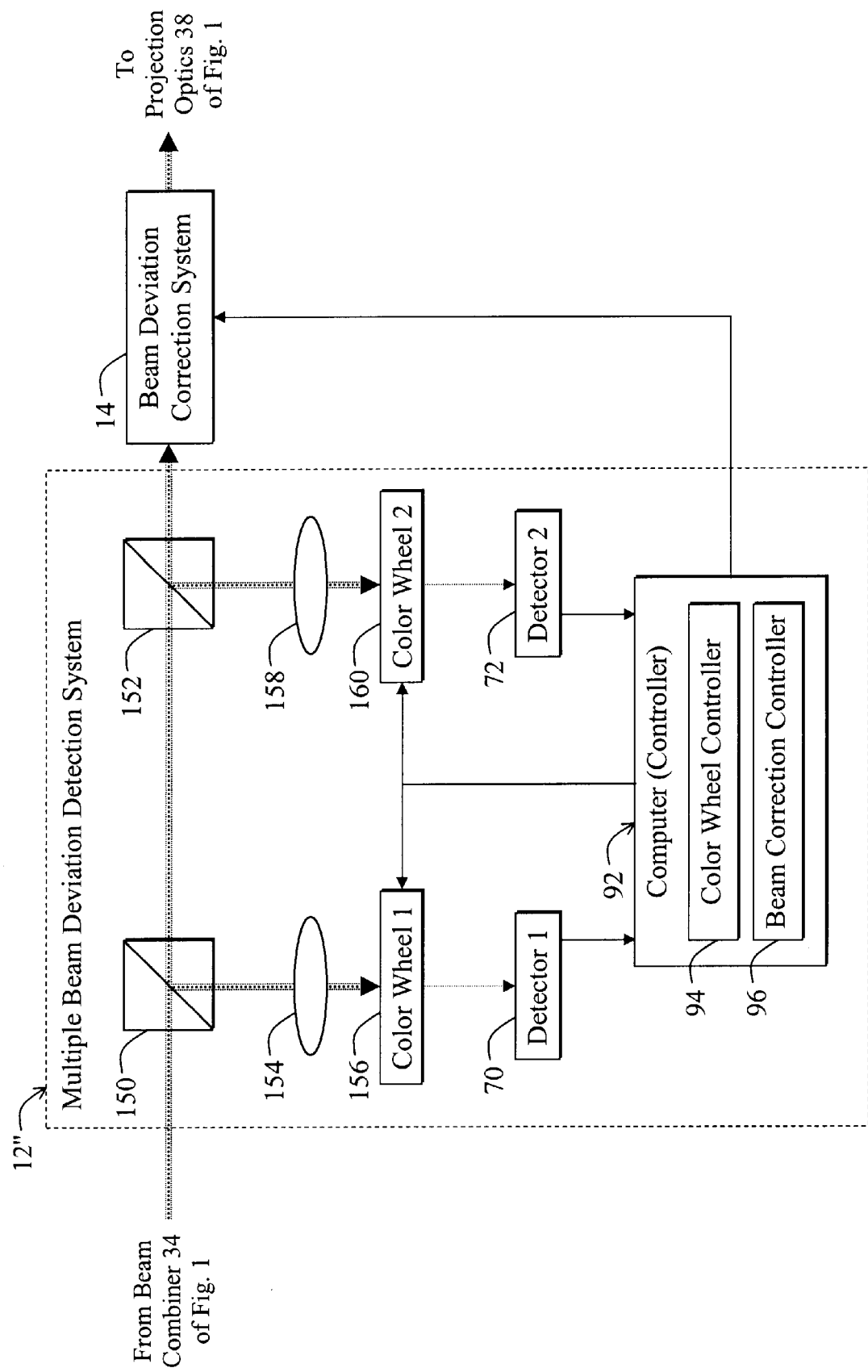
FIG. 6 is a diagram illustrating a second alternative embodiment of the multiple beam deviation detection system of FIG. 4.

FIG. 6 is a diagram illustrating a second alternative embodiment 12" of the multiple beam deviation detection system of FIG. 4. The multiple beam deviation detection system 12" includes a first pick-off beam splitter 150 in series with a second pick-off beam splitter 152. A picked-off output of the first pick-off beam splitter 150 is input to a first collimating lens 154, the output of which is provided to a first color wheel 156. The first color wheel 156 is in communication with the color wheel controller 94 running on the computer 92. An output of the first color wheel 156 is aimed at the surface of the first detector 70, which provides an electrical output to the computer 92.

The remaining multiple beams output from the first pick-off beam splitter 150 is input to the second pick-off beam splitter 152. The second pick-off beam splitter 152 outputs a second picked-off beam to a second collimating lens 158. The remaining beam is input to the beam deviation correction system 14. The second picked-off beam is collimated by the second collimating lens 158 and input to a second color wheel 162, which communicates with the color wheel controller 94 running on the computer 92. The output of the second color wheel 160 is directed to the surface of the second detector 72, which provides an electrical output signal to the computer 92. The computer 92 communicates with the beam deviation correction system 14 as discussed above. As mentioned, the system of the present invention can be employed with any number of detectors and any number of beams, as desired, to detect and/or correct misalignment either during operation of an associated device or prior to, or after operation such as at the time of manufacture or at a repair or maintenance time.

In operation, the first color wheel 156 and the second color wheel 160 select the same component beams from the input multiple beams for analysis. For example, if the first color wheel 156 selects the blue beam as output, then the second color wheel 160 will select the blue beam as output.

The path length of the beam from the first pick-off detector 150 to the surface of the second detector 70 is shorter than the path length of the beam that travels from the second output surface of the first pick-off beam splitter 150 to the surface of the second detector 72. Consequently, the beams selected by the color wheels 156 and 160 will deflect by different amounts on the surfaces of the detectors 70 and 72. The nature of this deflection or deviation is analyzed by the beam correction controller 96, which generates control signals to the beam deviation correction system 14 to correct any detected beam misalignments in response thereto.

Hence, the second alternative embodiment 12" employs two color wheels 156 and 160 and two photo detectors 70 and 72. The beams reaching the detectors 70 and 72 are split from the multiple beams at two different points corresponding to the first pick-off beam splitter 150 and the second pick-off beam splitter 152. These two points are sufficiently separated to allow the detectors 70 and 72 and associated computer 92 to accurately measure positional and angular beam deviations.

Figure 7:
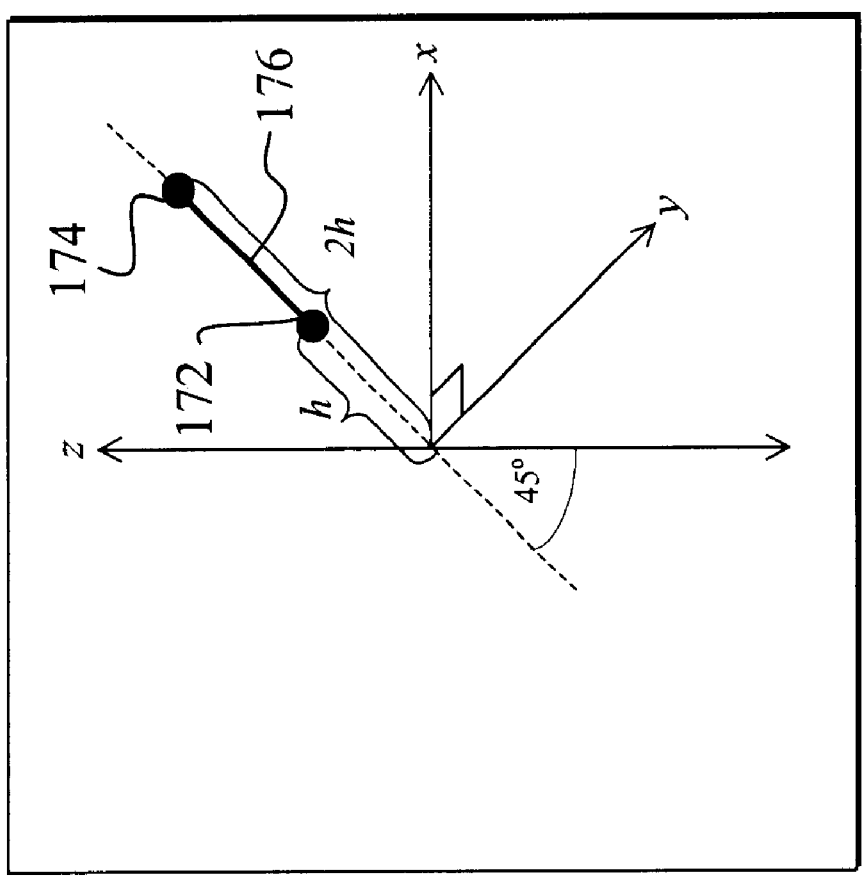
FIG. 7 is a diagram showing super-imposed detector surfaces illustrating deviation effects detected by the beam deviation detection systems of FIGS. 4–6.

FIG. 7 is a diagram showing super-imposed detector surfaces 170 illustrating deviation effects detected by the beam deviation detection systems 12, 12', and 12" of FIGS. 4–6 caused by an exemplary beam deviation of 45 degrees from a horizontal x-y plane and 45 degrees from a desired y-z plane, where the y-axis is the desired optical axis of the multiple beams. A first dot 172 corresponds to the position of a first component beam on the surface (x-z plane) of a first detector, such as the detector 70 of FIG. 4. A second dot 174 corresponds to the position of a second component beam on the surface (x-z plane) of a second detector, such as the detector 72 of FIG. 4. The second dot 174 is deflected twice as much (2h versus h) from the desired optical y-axis as the first dot 172. By calculating the angle formed by a line 176 between the fist dot 172 and the second dot 174, the angle by which the component beam deviates from the x-axis and/or z-axis in the x-z plane is easily determined. Any offset associated with the component beam is also easily determined by analyzing the distances between the dots 172 and 174 and the origin (x,y,z intercept).

Figure 8:
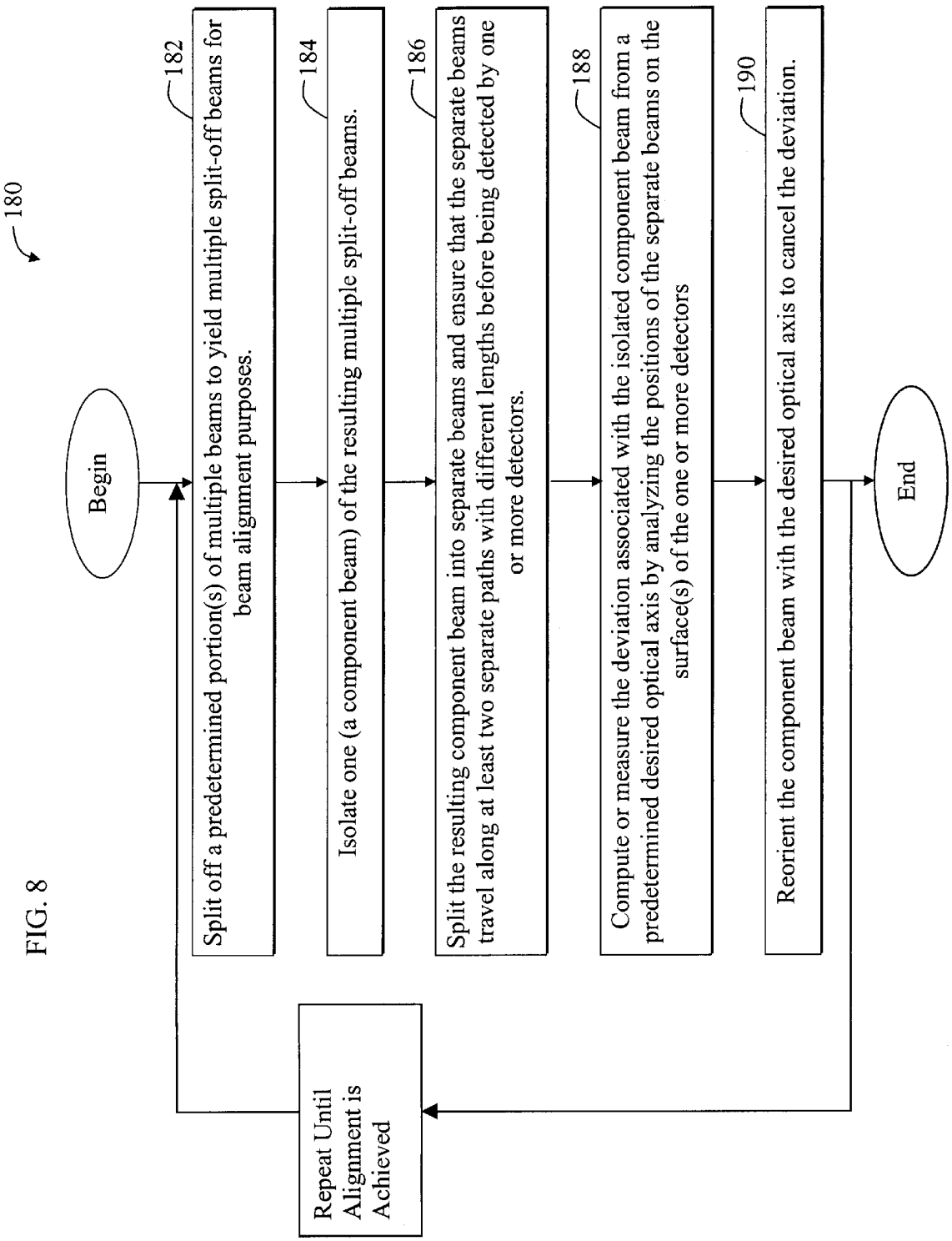
FIG. 8 is a flow diagram of a method implemented by the multiple beam deviation detection systems and correction systems of FIGS. 4–6.

FIG. 8 is a flow diagram of a beam deviation detection and correction method 180 of the present invention. In an initial pick-off step 182, a small portion of multiple beams for which alignment is to be performed is picked-off from a main set of multiple beams. Subsequently, control is passed to a component beam isolation step 184.

In the beam-isolation step 184, one or more of the component beams of the picked-off multiple beams are isolated in preparation for beam alignment checking. Control is then passed to a beam-splitting step 186.

In the beam-splitting step 186, one or more of the isolated component beams is (are) split into two separate paths of different lengths which culminate on the surface(s) of one or more detectors. Subsequently, control is passed to a deviation-computation step 188.

In the deviation-computation step 188, a control algorithm implemented in hardware or software computes the deviation(s) of the one or more isolated component beams based on the positions of the split component beams directed along the two separate paths on the surface(s) of the one or more detectors. Subsequently, control is passed to a beam-correction step 190.

In the beam-correction step 190, the one or more component beams is (are) realigned to cancel any deviation(s) or misalignment(s) associated with the isolated component beam(s).

Thus, the present invention has been described herein with reference to a particular embodiment for a particular application. Those having ordinary skill in the art and access to the present teachings will recognize additional modifications, applications, and embodiments within the scope thereof. For example, although specific reference has been made to multiple beams of coaxial laser light, aspects of the invention may be applicable to other types of light, or even non-coaxial multiple beams. Although the specification discusses visible light, the invention can be applied to any energy in the form of multiple beams such as infrared or ultraviolet wavelengths.

It is therefore intended by the appended claims to cover any and all such applications, modifications and embodiments within the scope of the present invention.

What is claimed is:

1. A system for detecting deviations of a component beam from an axis, said component beam associated with plural beams comprising:

first means for automatically selectively isolating individual component beams from said plural beams and providing each of said individual component beams as output in response thereto, said first means including means for redirecting a sample of said plural beams and providing separated plural beams in response thereto, said individual component beams including a red beam, a green beam, and a blue beam; and second means for detecting misaligmnent relative to said axis of an individual component beam output from said first means, wherein said first means includes a color wheel for automatically selectively isolating said red, green, and or blue beams from said separated plural beams and providing an isolated component beam as output in response thereto.

2. The system of claim 1 wherein said second means includes a beam splitter for splitting said isolated component beam into a first split beam and a second split beam and directing said first split beam and said second split beam along a first optical path and a second optical path, respectively.

3. The system of claim 2 wherein said first optical path terminates at a first detector and said second optical path terminates at a second detector.

4. The system of claim 3 wherein lengths of said first and second optical paths differ by a predetermined distance.

5. The system of claim 4 wherein said second means further includes a first control algorithm for comparing the relative position of said first split beam on said first detector to the position of said second split beam on said second detector with reference to said predetermined distance and providing a beam deviation signal in response thereto.

6. The system of claim 5 wherein said second means further includes a second control algorithm for actuating a beam deviation correction system to correct for beam deviations indicated by said beam deviation signal associated with said isolated beam.

7. The system of claim 2 wherein said first optical path passes through a first electrically controllable shutter, reflects from a first reflector, passes back through said beam splitter and then onto the surface of a single detector.

8. The system of claim 7 wherein said second optical path passes through a second electrically controllable shutter, reflects from a second reflector, passes back through said beam splitter and then onto the surface of said single detector.

9. The system of claim 8 wherein said second means includes a computer for selectively shuttering said first and second split beams via said first and second electrically controllable shutters to create first and second spots, respectively, on a surface of said single detector.

10. The system of claim 9 wherein said second means further includes a computer for analyzing positions of said first and second spots to measure beam deviation or misalignment associated with said isolated beam.

11. The system of claim 1 wherein said means for redirecting a sample includes a first pick-off beam splitter in series with a second pick-off beam splitter for redirecting a first sample along a first path and a second sample along a second path, respectively, of said plural beams.

12. The system of claim 11 wherein said first path passes through a first color wheel and terminates on the surface of a first detector, and wherein said second path passes through a second color wheel and terminates on the surface of a second detector, said first and second paths having predetermined differing lengths.

13. The system of claim 12 further including a controller for controlling said first and second color wheels and for calculating beam deviation associated with isolated beams output from said first and second color wheels.

14. A system for detecting and compensating for deviations from one or more optical axis of individual component beams associated with plural beams, said individual component beams including beams of different colors, comprising:

first means for selectively isolating said individual component beams from said plural beams and providing each of said individual component beams as output in response thereto;

second means for detecting a misalignment relative to said optical axis of an individual component beam output from said first means and providing a control signal in response thereto; and third means for correcting said misalignment in response to said control signal, wherein said first means includes a color wheel for selectively isolating said beams of different colors from said plural beams.

15. The system of claim 14 wherein said individual component beams include a red beam, a blue beam, and a green beam.

16. A laser projection system comprising:

first means for generating plural laser beams having plural component beams aimed along a predetermined optical axis, said component beams including a red beam, a green beam, and a blue beam;

second means for selectively isolating one of said component beams from said plural laser beams, detecting alignment deviations of said one of said component beams, and providing a signal in response thereto;

third means for correcting said alignment deviations in response to said signal; and fourth means for displaying an image via said plural laser beams, wherein said second means includes a color wheel for selectively isolating said red, blue and green beams and periodically providing said red, blue and green beams as output in response thereto.

17. The system of claim 16 wherein said second means further includes means for detecting deflection associated with said red beam, said blue beam, or said green beam.

18. The system of claim 17 wherein said means for detecting deflection includes means for selectively directing said red, blue, or green beam along a first path and a second path, said first path and said second path having path lengths that differ by a predetermined distance.

19. The system of claim 18 wherein said means for detecting deflection further includes means for computing deflection of said red, blue, or green beam, based on differences in deflection of said red, blue, or green beam associated with said first path and said second path.

20. A system for detecting misalignment of a component beam associated with plural laser beams comprising:

a pick-off device having an input and first and second outputs;

a color wheel in communication with said first output of said pick-off device;

a beam splitter having an input surface oriented toward an output surface of said color wheel, said beam splitter having first and second output apertures;

a first photo detector facing said first output aperture of said beam splitter and positioned a first distance from said first output aperture;

a second photo detector facing said second output aperture of said beam splitter and positioned a second distance from said second output aperture;

a beam deviation correction system in communication with said second output of said pick-off device; and a computer in communication with said first and second photo detectors, said beam deviation correction system, and said beam deviation correction system, said computer running a beam correction control algorithm.

* * * * *